No. 723,205. PATENTED MAR. 17, 1903.
H. A. LEWIS.
ELECTRICAL TESTING APPARATUS.
APPLICATION FILED OCT. 14, 1902.
NO MODEL. 2 SHEETS—SHEET 1.

Witnesses:
Frank L. A. Graham
Titus H. Loos

Inventor:
Harry A. Lewis,
by his Attorneys

No. 723,205. PATENTED MAR. 17, 1903.
H. A. LEWIS.
ELECTRICAL TESTING APPARATUS.
APPLICATION FILED OCT. 14, 1902.
NO MODEL. 2 SHEETS—SHEET 2.
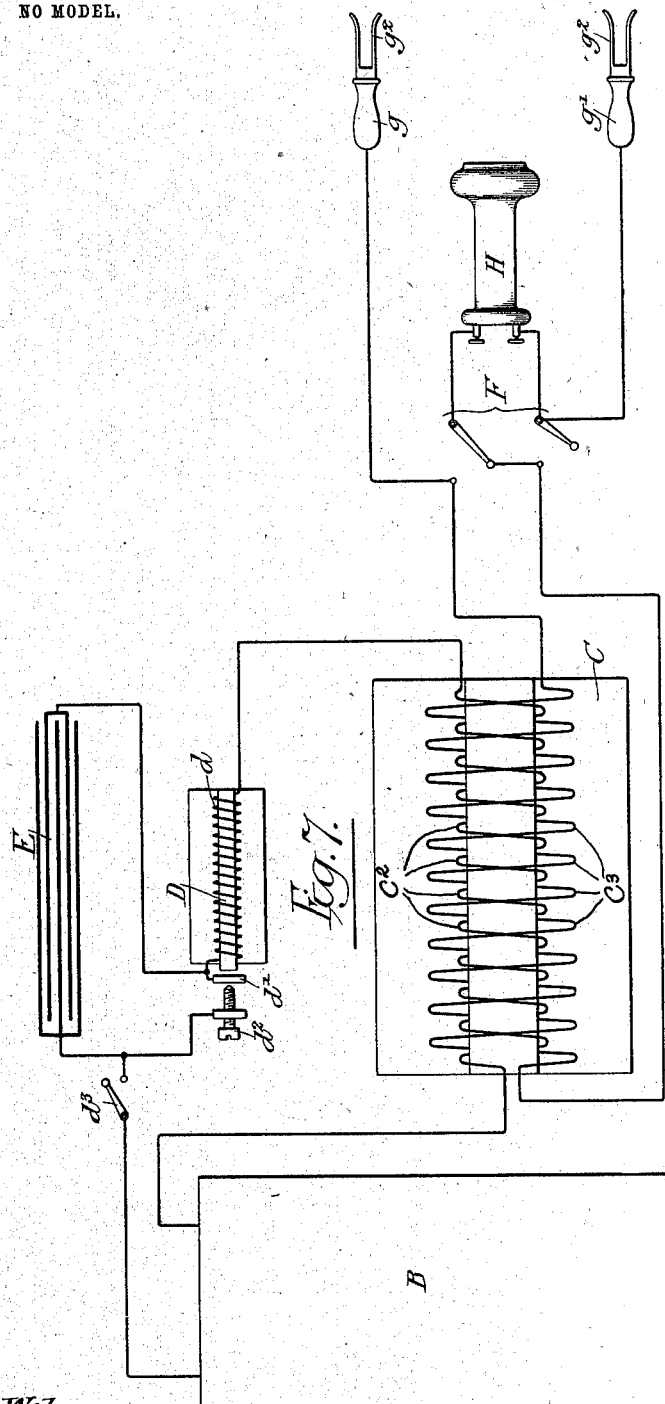
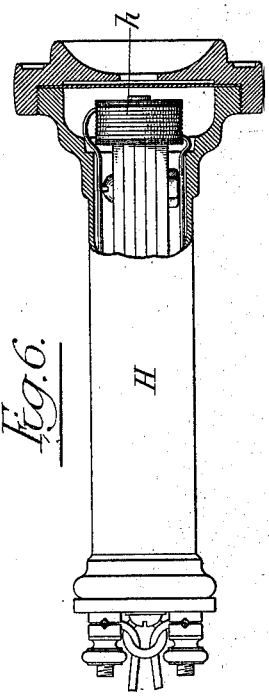
Fig. 6.
Fig. 7.
Witnesses:
Frank L. G. Graham
Titus N. Irons
Inventor:
Harry A. Lewis,
by his Attorneys
Howson & Howson

UNITED STATES PATENT OFFICE.

HARRY A. LEWIS, OF NORRISTOWN, PENNSYLVANIA, ASSIGNOR OF ONE-HALF TO WILLIAM J. CASKEY, OF PHILADELPHIA, PENNSYLVANIA.

ELECTRICAL TESTING APPARATUS.

SPECIFICATION forming part of Letters Patent No. 723,205, dated March 17, 1903.

Application filed October 14, 1902. Serial No. 127,308. (No model.)

*To all whom it may concern:*

Be it known that I, HARRY A. LEWIS, a citizen of the United States, residing at Norristown, Pennsylvania, have invented certain Improvements in Electrical Testing Apparatus, of which the following is a specification.

My invention relates to certain improvements in apparatus for determining the condition of electrical circuits, and more particularly consists in an improved testing set for revealing the existence and location of loose connections, short circuits, or open circuits in various forms of electrical apparatus, especially in the armatures of generators, motors, and similar electrical machines.

The object of my invention is to provide an easily-transportable and compact apparatus for performing the above-mentioned class of work, a further object being to construct the device so that it shall do its work with more certainty and efficiency than has heretofore been attainable with that class of apparatus to which the invention belongs. These objects I attain as hereinafter set forth, reference being had to the accompanying drawings, in which—

Figure 2:
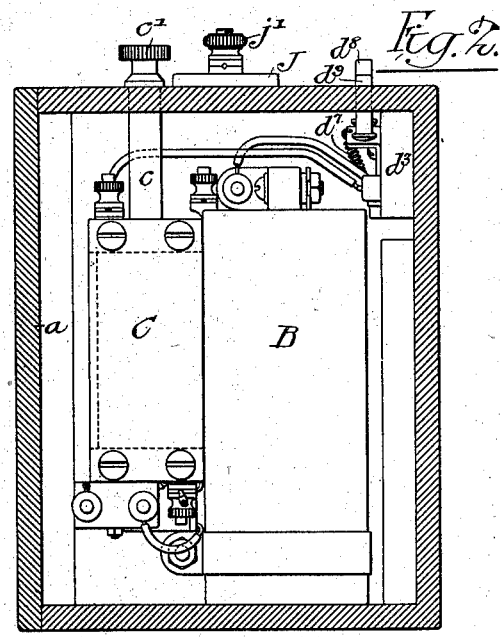
Figure 5:
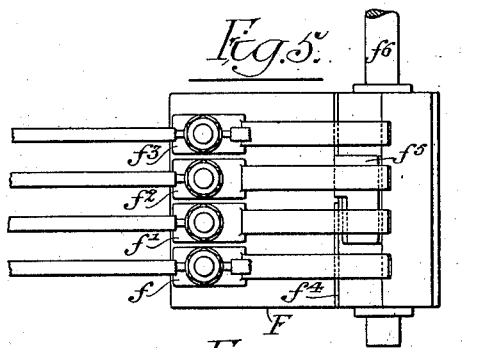
Figure 4:
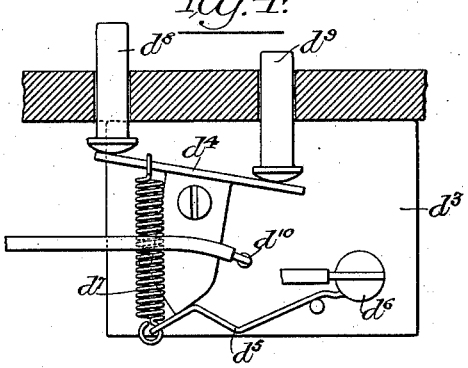
Figure 1:
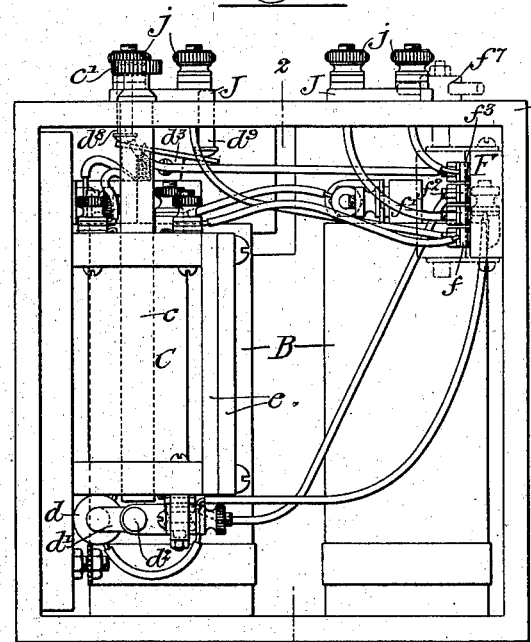
Figure 3:
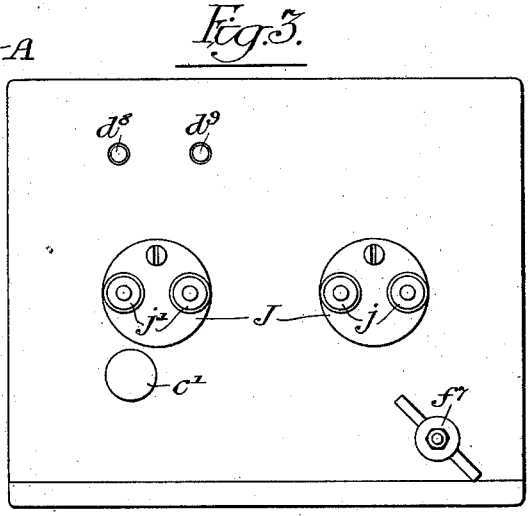

Figure 1 is a front elevation of my improved device, showing its different parts as assembled within a suitable casing. Fig. 2 is an elevation, partly in section, of my improved apparatus, the view taken on the line 2 2, Fig. 1. Fig. 3 is a plan view of the outside of the containing-casing, showing the relative positions of portions of my improved device. Figs. 4 and 5 are front elevations of two of the switches used in connection with and forming part of my invention. Fig. 6 is a side elevation, partly in section, of the telephone-receiver used in connection with my testing set; and Fig. 7 is a diagrammatic view illustrating the different parts of the device and indicating the electrical connections of the same.

In the above drawings, A is a containing box or casing of a size to be readily and conveniently transportable, having a door or front $a$ and containing, in the present instance two cells B of dry battery and an induction-coil C, this latter being provided with an adjustable iron core $c$, which extends through the top of the box or casing and is provided with a head $c'$. This induction-coil varies from the ordinary well-known form in having but relatively few turns of comparatively large-sized wire for both its primary and secondary windings, which are indicated by the letters $c^2$ and $c^3$, respectively, in Fig. 7, there being a vibrating current-interrupter D, connected in series with the primary winding of the induction-coil and the cells of battery. In the present instance this vibrator consists of a magnet $d$, having the customary oscillating armature $d'$ and an adjustable contact-point $d^2$. I preferably connect a condenser E in shunt with the oscillating armature $d'$ and the contact-point $d^2$ and control the flow of current through the apparatus by means of the switch $d^3$. The condenser E consists of two sheets of fiber, (indicated at $e$ in Fig. 1,) preferably inclosing between them sheets of tin-foil (not shown) and insulated from one another, the terminals of the condenser being connected to alternate sheets in the well-known manner.

The switch $d^3$ consists of an oscillating member $d^4$, pivotally mounted within the casing and at all times forming electrical contact with a piece $d^5$, attached to a terminal post $d^6$ and constantly pulled toward the piece $d^4$ by means of a spring $d^7$. Push-buttons $d^8$ and $d^9$ bear against the extended portions of the oscillating piece $d^4$, and the piece $d^5$ is of such a shape that the said piece $d^4$ is held in either one of two positions, in one of which it forms electrical contact with the terminal post $d^{10}$ and through it to one of the wires of the circuit. As shown in the figures, the push-buttons $d^8$ and $d^9$ extend through the top of the containing-casing, so as to be manipulated from the outside.

In series with the secondary winding of the induction-coil is a commutating-switch F, having four terminals or binding-posts $f, f', f^2$, and $f^3$, as shown in Fig. 5, to which are connected six wires, two being the terminals of the secondary winding in the induction-coil, two others belonging to testing-handles $g\ g'$ and having spring-clips $g^2$, while the two last are connected to the terminals of a telephone-receiver H. This receiver may be constructed in the manner well known to the art, except that its magnet $h$ is wound with comparatively few turns of relatively coarse wire, making it of relatively low resistance. The switch F is provided with a revoluble barrel having contact-plates $f^4$ and $f^5$ so mounted that in one position it connects the telephone-receiver H in series with the secondary winding of the induction-coil and with the portion of the circuit including the testing-handles $g$ and $g'$, while in its other position the said plates connect the receiver in multiple with the circuit containing the secondary winding of the induction-coil and the testing-handle. From the figures it will be seen that the spindle $f^6$, on which the revoluble portion of the switch is mounted, projects through the top of the casing and is provided with an operating-handle $f^7$.

In use the various parts of my invention are assembled as illustrated, being connected as shown diagrammatically in Fig. 7, and when operated to detect, for instance, a grounded commutator-bar one of the testing-handles is placed in contact with the armature-shaft and the other is moved over the commutator, it being understood that the telephone-receiver H is held to the ear of the person making the test. Upon turning the switch $d^3$ to its "on" position the vibrator alternately makes and breaks the primary circuit of the device, and when the switch F is turned to one of its positions a comparatively loud humming is heard in the receiver as long as there is even a slight electrical resistance in that portion of the circuit included between the ends of the testing-handles and in the present instance between the armature-shaft and the commutator. As, however, the testing-handle upon the commutator is moved over the bars of the same it will at once be noted that there are certain positions upon the commutator at which the humming noise of the receiver is not as loud as at others, and finally it will be noted that there is a point at which the sound almost or entirely ceases. Upon examination it will invariably be discovered that it is at this location that a bar is grounded on the armature-shaft. If now the switch F is turned to its second position, it will be found that the above-noted conditions are reversed, the humming noise in the receiver being loudest when the testing-handle is moved on the commutator to that position in which the resistance between one of the bars and the shaft is at a minimum, or, in other words, when it is in contact with the grounded commutator-bar. Similarly when testing between commutator-bars for short-circuiting, with the switch F in the position first referred to above, both testing-handles are placed upon the same commutator-bar, and when one of them is moved to the next adjacent bar the humming sound in the telephone-receiver will be increased only if there is no connection between said bars save through the armature coil or coils.

When it is desired to cut out or replace a burned-out or injured armature-coil, it is a comparatively simple matter to quickly find the second end of said coil, since upon one of the testing-handles being placed at the visible end of the coil to be examined and the other testing-handle moved around the commutator the sound in the telephone-receiver becomes indistinct or ceases only when said second handle is in contact with the bar to which the second end of the coil is connected.

The intensity of the sound in the telephone-receiver can at any time be varied by adjusting the position of the movable core of the induction-coil, while the humming noise can be produced in the telephone-receiver either upon an open circuit between the testing-handles, or vice versa, by proper manipulation of the switch F.

In the form of my device illustrated in Figs. 1 to 6 I have provided two ebonite pieces J, fixed to the top surface of the casing A, each of which has mounted upon it a pair of terminals $j$ and $j'$, so that under operating conditions one of the conductors from the telephone-receiver and one of the conductors from a testing-handle can be connected to the two terminals $j$, respectively, while the second conductor from the telephone-receiver and the conductor from the second testing-handle are connected to the terminals $j'$.

I have found after careful experiment that it is only by the use of a comparatively coarse winding upon the magnet of the telephone-receiver, as well as by the use of low-resistance windings for the induction-coil, that the device is rendered practical under operating conditions, for it is only when the various portions of the apparatus in the secondary circuit of the induction-coil are all of relatively low resistance that the combination set forth is found to be practically available for use in armature-testing. In other words, since armatures as a class are of relatively low resistance and since all tests of the same have to do with small differences of resistance it is necessary that the windings of parts of the apparatus noted above be also of low resistance to give the best results.

I claim as my invention—

1. In a testing apparatus, the combination of a primary circuit containing a generator, one winding of an induction-coil and a current-interrupter, with a secondary circuit including the secondary winding of the induction-coil, testing-terminals and a telephone-receiver, the said secondary winding and the winding of the telephone-receiver being of a resistance relatively the same as that of the circuit to be tested, substantially as described.

2. The combination in a testing apparatus, of a primary circuit including a generator, a current-interrupter and the primary winding of an induction-coil, with a secondary circuit including the secondary of the induction-coil, a telephone-receiver and testing-terminals, the said secondary winding and the winding of the telephone-receiver being both of relatively low resistance, substantially as described.

3. The combination in a testing apparatus, of a primary circuit including a generator, a current-interrupter and the primary winding of an induction-coil, with a secondary circuit including the secondary winding of the induction-coil, a telephone-receiver, and testing-terminals, with a switch for throwing said telephone-receiver either in series or in multiple with said testing-terminals, substantially as described.

4. The combination in a testing apparatus of a primary circuit including a generator, a current-interrupter and the primary winding of an induction-coil and a condenser in multiple with said current-interrupter, with a secondary circuit including the secondary winding of the induction-coil, a telephone-receiver and testing-terminals, substantially as described.

5. The combination in a testing apparatus, of a generator, a current-interrupter and the primary winding of an induction-coil, said primary winding consisting of relatively few turns of low-resistance wire with a secondary circuit including the secondary winding of the induction-coil, a telephone-receiver and testing-terminals, said telephone-receiver and the secondary of the induction-coil being also both wound with relatively few turns of low-resistance wire, substantially as described.

6. In a testing apparatus, the combination of a containing-casing, a battery, an induction-coil and a current-interrupter therein, said induction-coil having an adjustable core extending to the outside of the casing, a telephone-receiver, and testing-terminals in electrical connection with the secondary winding of the induction-coil together with a switch for controlling the flow of current from the battery, substantially as described.

In testimony whereof I have signed my name to this specification in the presence of two subscribing witnesses.

HARRY A. LEWIS.

Witnesses:
O. F. LENHARDT,
WM. J. CASKEY.